Nov. 4, 1930.                C. BENNETT                1,780,458
               REVERSIBLE STEAM TURBINE ENGINE
                 Filed July 12, 1928    3 Sheets-Sheet 1
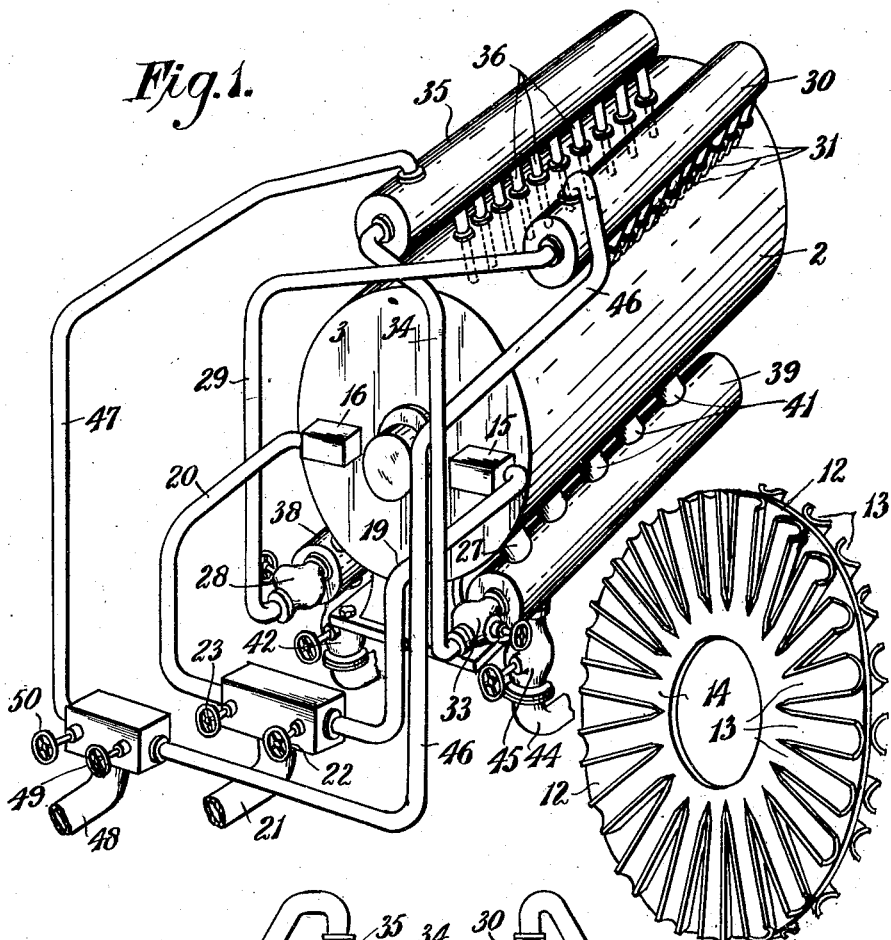
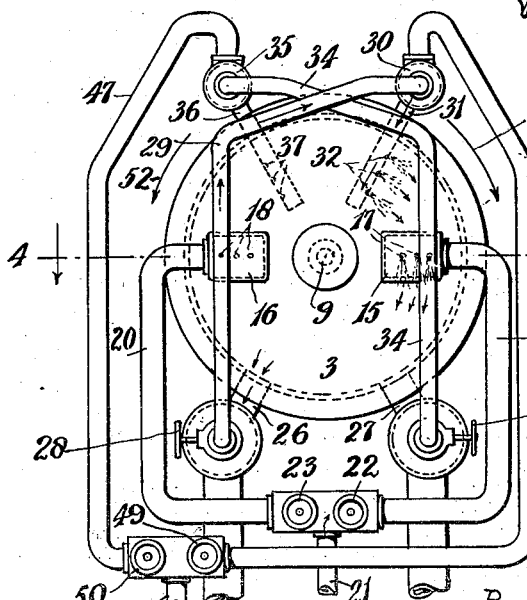
Inventor:
Clifford Bennett
By Emil Bonnelycke
       Attorney

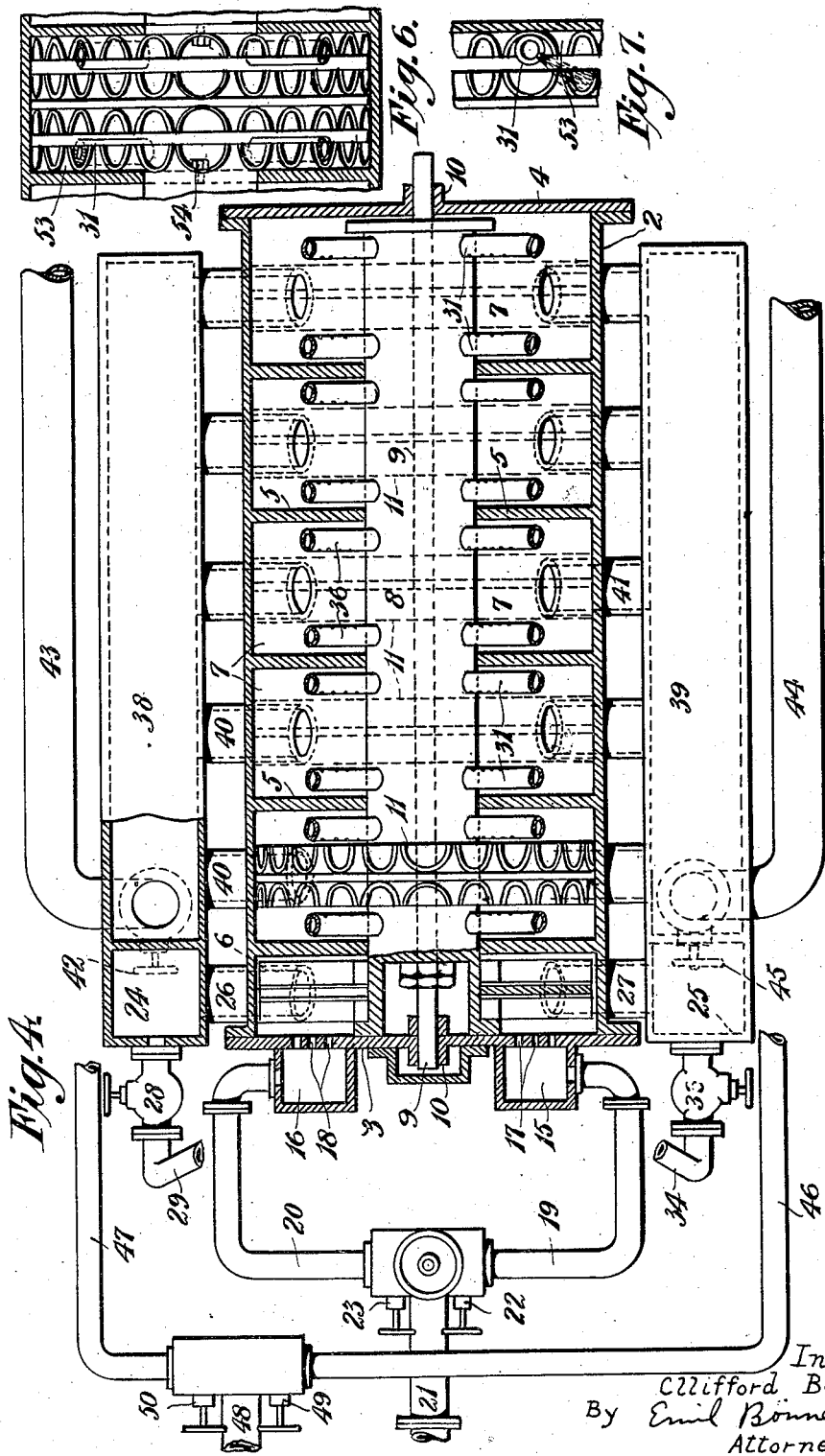

Patented Nov. 4, 1930

1,780,458

UNITED STATES PATENT OFFICE

CLIFFORD BENNETT, OF RICHMOND, NEW SOUTH WALES, AUSTRALIA

REVERSIBLE STEAM TURBINE ENGINE

Application filed July 12, 1928. Serial No. 292,229.

This invention relates to an improved reversible steam turbine engine which is particularly suited for marine work, and is of such construction as will enable high speeds to be rapidly developed and maintained with high efficiency from the steam used.

Turbine engines of the types at present used are not conveniently reversible. Consequently, it is usual on steamships and vessels driven by such engines to use two separate engines, or engine sections, one for propelling the vessel ahead and the other for propulsion astern.

The invention provides a turbine engine which can have its direction of rotation quickly and conveniently reversed, thus enabling a single engine to be used for propelling a vessel both ahead and astern. The invention thus dispenses with the requirement of two separate engines or engine sections, and thereby effects a large saving in cost of power units for steamships and in the installation thereof.

Referring now to the accompanying drawings:—

Figure 1 is a perspective view of the improved turbine engine.

Figure 2 is a side view.

Figure 4 is a sectional view of the turbine engine taken on line 4—4 of Figure 2.

Figure 5 is a perspective view of one of the rotors.

Figure 6 is a sectional view illustrating a constructional modification.

Figure 7 is a detail of the modification shown in Figure 6.

Figure 3:
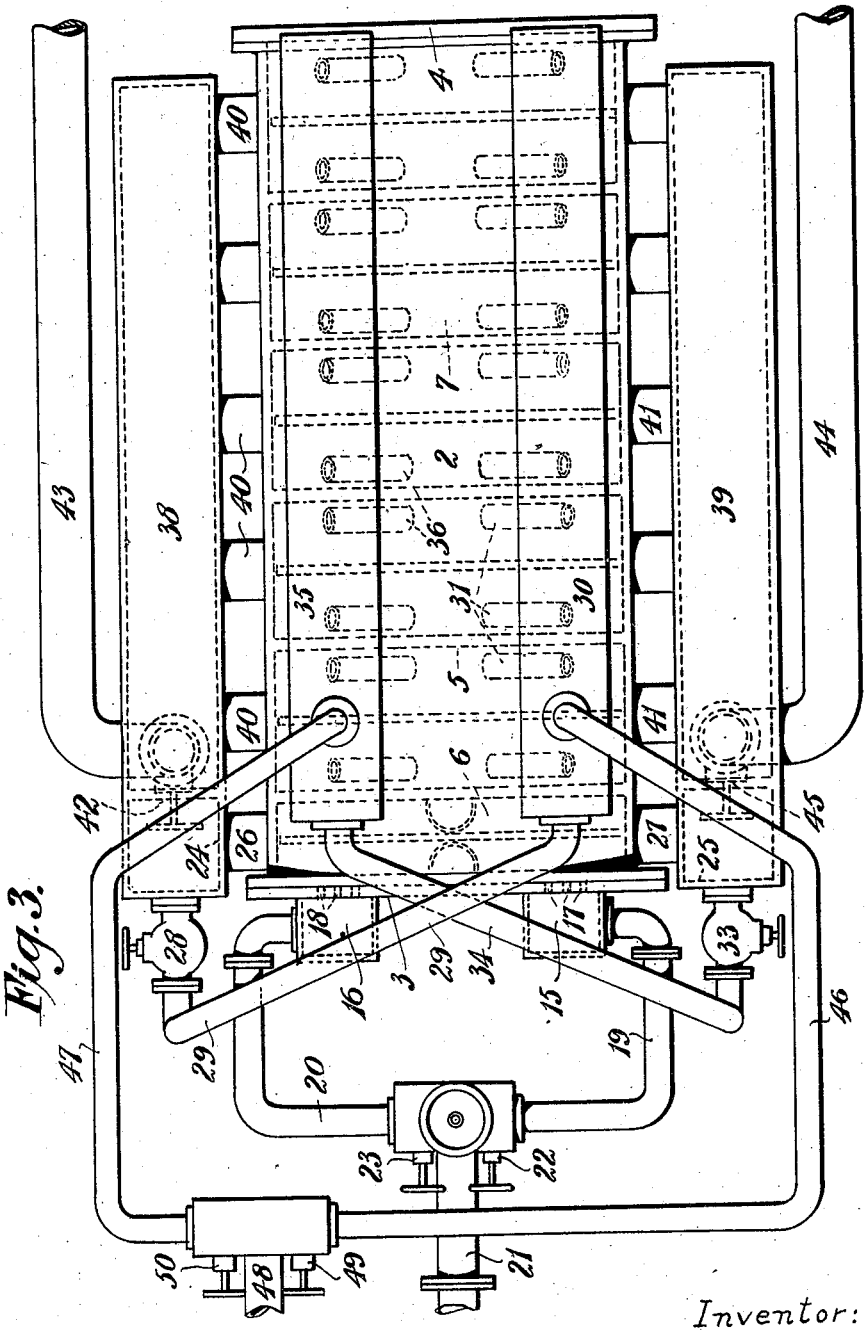
Figure 3 is a plan view of the turbine engine.

The improved turbine engine comprises a cylindrical casing 2 fitted with end plates 3 and 4. The interior of the casing has a series of partitioning walls 5, which form a high pressure steam chamber 6 and a series of steam expansion chambers 7. Arranged longitudinally within the casing 2 is a drum or hub member 8, which is revolvably mounted in suitable bearings formed by the partitioning walls 5. This drum is rigidly secured onto a propeller shaft or main shaft 9 journaled in bearings 10 on the casing end plates 3 and 4.

Rigidly secured on the drum 8 in spaced relationship are a series of rotors 11, one for each of the steam chambers 6 and 7. Each rotor, see Figure 5, comprises a central disc 12 and a series of radially arranged vanes 13 disposed on each face of said disc. The vanes 13 may be formed integrally on metal plates 14, which are welded or otherwise rigidly secured to the central disc 12, or, alternatively, the whole rotor structure may be constructed of cast metal.

Provided on the end plate 3 are two small chambers 15 and 16 arranged diametrically opposite. These small chambers are connected by inclined jets 17 and 18, respectively, to the high pressure steam chamber 6. The jets 17 of the chamber 15 are so inclined that the steam injected therethrough impinges on the vanes 13 to drive the rotor in one direction, while the jets 18 of the other chamber 16 are arranged to cause the steam to drive the rotor in reverse direction. Thus, the chamber 15 and jets 17 provide for the forward drive, while the chamber 16 and jets 18 provide for the reverse drive. The chambers 15 and 16 are connected by pipes 19 and 20, respectively, to a steam pipe 21 leading from a boiler or steam generator (not shown). The pipe 19 is fitted with a control valve 22, while the other pipe 20 has a similar valve 23.

Mounted beneath the engine casing 2 are two exit chambers 24 and 25 receiving steam from the high pressure chamber 6 by passages 26 and 27, respectively. The chamber 24 is connected by a valve 28 and pipe 29 to a steam inlet manifold 30, which extends above the casing 2 and is connected by pipes 31 to the steam expansion chambers 7. Two pipes 31 are provided for each expansion chamber 7. These pipes are arranged on opposite sides of the rotors 11 as shown in Figure 4 and are provided with jets 32 angularly arranged to direct steam against the vanes of the rotor to propel the same in forward direction.

The other exit chamber 25 is connected via a valve 33 and pipe 34 to a similar steam inlet manifold 35 arranged adjacent to the manifold 30 and also connected by pipes 36 to the steam expansion chambers 7. Two of said pipes 36 are similarly provided for each expansion chamber and are arranged on opposite sides of the rotors. Angular jets 37 are formed in said pipes 36, through which the steam can be directed against the vanes of the rotor to propel said rotor in the reverse direction.

Provided beneath the engine casing are two exhaust manifolds 38 and 39. The first manifold 38 is connected by passages 40 to each of the steam expansion chambers 7, while the other manifold 39 is similarly connected to said chambers 7 by separate passages 41. The manifold 38 is connected through a valve 42 to the exhaust pipe 43, and the other manifold 39 is connected to an exhaust pipe 44 through a valve 45.

Connected to the inlet manifolds 30 and 35 are pipes 46 and 47 leading to a pipe 48, which is connected to the main steam boiler, or if desired to an auxiliary boiler. The pipe 46 is furnished with a control valve 49, while the pipe 47 has a valve 50.

When the turbine engine is being driven in the forward direction as for propelling a vessel ahead, the control valves 22, 28 and 42 are open, while the other valves are closed. High pressure steam from the pipe 21 passes along the pipe 19 to the chamber 15 on the casing end plate 3, and is thence directed through the angular jets 17 against the vanes of the rotor in the high pressure chamber 6. The impingement of the steam against said vanes causes the rotor to be driven in the direction of the arrow 51 shown in Figure 2. The steam escapes from the high pressure chamber through the passage 26 into the exit chamber 24, and thence passes by way of valve 28 and pipe 29 to the inlet manifold 30 above the engine casing. From said inlet manifold, the steam passes through all of the pipes 31 simultaneously and is directed by the jets 32 against the vanes on opposite sides of the rotors in the steam chambers 7. The expansion of the steam together with the force of its impingement causes these rotors to be impelled in the forward direction. The spent steam from the expansion chambers 7 escapes through the passages 40 to the exhaust manifold 38, and thence via the valve 42 to the exhaust pipe 43.

To reverse the direction of rotation of the engine as for propelling the vessel astern, the valves 22, 28 and 42 are closed and the valves 23, 33 and 45 are opened. The high pressure steam from the pipe 21 then passes through the pipe 20 to the chamber 16 and is directed through the jets 18 into the chamber 6 to impinge against the vanes of the rotor therein and drive the rotor in the reverse direction, as indicated by arrow 52 in Figure 2.

The steam escapes from the high pressure chamber 6 through the passage 27 into the exit chamber 25, and thence passes via the valve 33 and pipe 34 to the inlet manifold 35. From this inlet manifold, the steam passes to all of the pipes 36 and is directed through the jets 37 against the vanes on opposite sides of the rotors in the steam chambers 7, the expansion of the steam together with its impingement force causing the rotors to be impelled in the reverse direction. The spent steam from the expansion chambers 7 passes through the passages 41 to the exhaust manifold 39, and thence via the valve 45 to the exhaust pipe 44.

During normal operation of the turbine engine, the valves 49 and 50 are maintained closed, but when it is desired to rapidly develop high speed, or increase the power of the engine, either one of said valves is opened to admit high pressure steam from the pipe 48 directly into the expansion chambers 7. High pressure steam is thus caused to act on all of the rotors of the engine, resulting in increased speed and power. If the turbine is rotating in the forward direction, the valve 49 is opened to admit the high pressure steam through the manifold 30 and jets 32, but if the engine is reversed the valve 50 is opened, admitting the high pressure steam to the expansion chambers through the manifold 35 and jets 37.

In the modified construction of the invention illustrated in Figures 6 and 7, fixed vanes 53 are provided adjacent to the opposite sides of each rotor in the steam expansion chambers 7. These fixed vanes are arranged in register with the vanes 13 of the rotors and they function as baffles to direct the steam against the rotor vanes. The pipes 31 and 36 leading from the two inlet manifolds are arranged within the fixed vanes 53 and have their jets so positioned that the steam is directed angularly against the movable vanes as is shown by broken lines in Figure 7. The fixed vanes 53 may be formed integrally on a metal plate in similar manner to the movable vanes 13 and they are preferably rigidly secured to the partitioning walls 5 by bolts such as 54.

All of the various control valves of the engine may be arranged for manipulation from a common control board. If desired, master controls may be provided, one of such controls functioning to open or close all of the valves controlling the steam for driving the engine in one direction, and the other master control actuating the other valves for controlling the reversing of the engine.

What I do claim is:—

1. An improved reversible steam turbine engine comprising, a cylindrical casing divided to form a high pressure chamber and a series of steam expansion chambers, rotors arranged in said chambers mounted on a common shaft, two steam chambers having jets through which steam is directed to drive the rotor of the high pressure chamber in forward and reverse directions, respectively, means for supplying steam to either of said steam chambers, two inlet manifolds connected to the expansion chambers and having jets arranged to direct steam against the rotors therein to drive them in either direction, means for conducting the exhaust steam from the high pressure chamber to either of said inlet manifolds, and exhaust manifolds receiving the spent steam from the expansion chambers, and wherein the inlet manifolds have two pipes extending into each expansion chamber, said pipes being arranged at opposite sides of the rotors to direct the steam against vanes mounted on both sides of the rotors.

2. In a reversible steam turbine engine, a cylindrical casing divided internally to form a high pressure chamber and a series of expansion chambers companion thereto; a rotor in each of said chambers, all the rotors being mounted on a common shaft; two steam chambers attached to the casing immediately adjacent the high pressure chamber and having jets which open into that chamber to direct steam against the rotor therein and drive the same in either direction; a high pressure steam pipe; a branch pipe leading therefrom to each steam chamber; a controlling valve for each branch pipe; a pair of inlet manifolds, one having jets discharging steam into the expansion chambers against one side of the rotors therein, and the other having jets discharging steam into said expansion chambers against the other side of the rotors; a pair of exhaust chambers to receive exhaust steam from the high pressure chamber; a valve-controlled pipe leading from each exhaust chamber to the corresponding inlet manifold; and a pair of exhaust manifolds connected with the expansion chambers to receive the spent steam therefrom.

In testimony whereof I affix my signature.

CLIFFORD BENNETT.